United States Patent [19]

Grunfeld et al.

[11] Patent Number: 5,004,547

[45] Date of Patent: Apr. 2, 1991

[54] METHOD AND APPARATUS FOR BIOAFFINITY SEPARATION

[75] Inventors: Hay Grunfeld; Noah Lotan; Samuel Sideman, all of Haifa, Israel

[73] Assignee: Technion Research & Development Foundation Ltd., Haifa, Israel

[21] Appl. No.: 376,552

[22] Filed: Jul. 5, 1989

[30] Foreign Application Priority Data

Jul. 6, 1988 [IL] Israel ........................................ 87004

[51] Int. Cl.[5] .............................................. B01D 15/08

[52] U.S. Cl. .................................... 210/635; 210/656; 210/96.1; 210/101; 210/143; 210/198.2; 530/413; 435/219; 435/815

[58] Field of Search ..................... 210/635, 659, 198.2, 210/264, 656, 96.1, 101, 143; 73/61.1 C; 422/70; 435/219, 815; 530/413

[56] References Cited

U.S. PATENT DOCUMENTS 2,487,574 11/1949 Meng .................................. 210/656
3,873,514 3/1975 Chu et al. ............................ 210/635
3,917,527 11/1975 Shaltiel ............................... 210/635
4,001,112 1/1977 Barker et al. ........................ 210/659
4,155,846 5/1979 Novak et al. ......................... 210/659
4,274,967 6/1981 Snyder ................................ 210/659
4,415,631 11/1983 Schutijser ......................... 210/198.2
4,791,100 12/1988 Kramer et al. ........................ 514/12

OTHER PUBLICATIONS

L. R. Snyder et al., *Introduction to Modern Liquid Chromatography,* 2nd ed., pp. 118–119,1979.

*Primary Examiner*—Ernest G. Therkorn
*Assistant Examiner*—Krisanne Shideler
*Attorney, Agent, or Firm*—Herbert Dubno

[57] ABSTRACT

Bioaffinity separation is carried out in a cascade of column segments under control of a computer which selectively connects each column segment to a collector so that the individual bioactive components which are selectively retained by a biospecific sorbent can be individually collected. The volume and flow rate of eluate collected following each segment serve as the measure for the addition of makeup eluant between that column segment of the cascade and the next column segment.

12 Claims, 3 Drawing Sheets

P 36 P 38 C $C_I$ 37 FEED 10 26 16 13 V F MICROPROCESSOR (COMPUTER) CONTROLLER 29 RECOVERED COMPONENT ( I ) 19 $C_{II}$ 30 P 31 11 27 17 P 32 V F 14 P 33 RECOVERED COMPONENT ( II ) 20 35 P 34 $C_{N-1}$ 12 18 V F 15 28 RECOVERED COMPONENT ( M-1 ) 21 $C_N$ 25 V 22 24 BALANCE RECOVERED COMPONENT ( M ) 23

METHOD AND APPARATUS FOR BIOAFFINITY SEPARATION

FIELD OF THE INVENTION

Our present invention relates to a method of and to an apparatus for bioaffinity separation in which, utilizing a sorbent carrying a material or substance (ligand) to which a particular bioactive species may have affinity, it is possible to separate that species from other bioactive species or other substances, utilizing chromatographic principles. More particularly the invention relates to improvements in bioaffinity separation which can permit selective and efficient recovery of one or more bioactive components and especially the bioactive component or components of a mixture which are most important or valuable for a particular purpose.

BACKGROUND OF THE INVENTION

There is considerable literature relating to bioaffinity separation techniques based upon the principle that a column, operated generally on the principles of a chromatographic separation, whereby a sorbent to which a particular component of a mixture of bioactive components has affinity may be used for the separation of that component and its recovery.

For the purposes of this description, when we refer to the principles of chromatography or chromatographic separations generally, we intend to denote those separation techniques which involve selective retention on the active material of the column of a particular component of a mixture or the retardation of migration through the column of a particular component or of particular components so that, upon elution by an eluant, the concentration of a component to be separated in the eluate at a particular time during the progress of elution is substantially greater than the concentration of that component in the original mixture.

The principle has been applied to the separation of bioactive materials. The term "bioactive material" or "bioactive component" is here used to refer to a molecular species in a mixture which is active biologically in some fashion. It may be, for example, a hormone, a pharmaceutically active compound, a species capable of cell binding or a substance active in molecular biology or genetics or produced by molecular biology, cloning or hybridization techniques. It may also be a dietary supplement, a fragrance or other cosmetics component, or a substance having laboratory, testing or analytical interest.

A number of patents have been issued which utilize the principles of bioaffinity separation and which disclose various biospecific sorbents which may be used in the principles of this invention.

For example, U.S. Pat. No. 4,661,408 describes the use of chromium dioxide particles as support in bioaffinity separations while U.S. Pat. No. 4,554,088 describes bioaffinity separations utilizing magnetic particles.

A quantitative screening protocol for the assay of tumor globulin utilizes a biospecific sorbent in U.S. Pat. No. 4,656,025 and U.S. Pat. No. 4,655,918 describes the use of bioreactors in the microbiological cleaning of waste water (see also U.S. Pat. No. 4,505,820).

Electrical principles can also be used to control migration in columns containing specific sorbents (See U.S. Pat. No. 4,642,169) and complex apparatus can also be provided to utilize the principles (see U.S. Pat. No. 4,597,947).

Other related patents which consider the use of chromatography for the separation of biological substances include U.S. Pat. Nos. 4,431,544; 4,375,401; 4,289,628; 4,283,199; 4,278,594; 4,210,580; 4,067,825; 4,062,831; 3,994,805; 3,965,130; 3,853,765; and 3,784,467.

It is desirable to increase the selectivity and efficiency of bioaffinity separations and this is the problem attacked by the present invention.

OBJECTS OF THE INVENTION

It is the principal object of the present invention to provide an improved method of effecting bioaffinity separations whereby drawbacks as to the selectivity and efficiency of earlier separation techniques can be obviated and, particularly, the ability to select among particular components to be recovered can be enhanced in a convenient and economical manner.

Another object of this invention is to provide an improved apparatus for carrying out bioaffinity separations which affords the possibility of greater control over the separation than has been possible heretofore and particularly can provide the ability to selectively recover particular components of a biological mixture so as to enhance the separability thereof and thereby render current techniques in molecular biology for producing such materials more effective by providing a high efficiency separation technique.

It is also an object of the invention to provide a method and an apparatus for carrying out separations which have substantially universal applicability to the separation of practically any substance for which a specific sorbent can be provided and such that the method and apparatus can be set up in an appropriately designed manner and utilized with a minimum of difficulty.

SUMMARY OF THE INVENTION

These objects and others which will become apparent hereinafter are attained, in accordance with the present invention in a method of bioaffinity separation for recovering a plurality of bioactive components of a liquid feed which comprises introducing the liquid feed into a first of a plurality of bioaffinity retention stages connected in cascade and constituting respective column segments of a separation column containing at least one biospecific sorbent so that the segments are loaded with the components to different degrees along the length of the column.

We then pass an eluant through the column segments in cascade to elute the components of the feed from the biospecific sorbent in each column segment.

By automatically connecting an outlet from each column segment to a respective collector upon passage of faster-eluting components of the feed to a successive column segment, we recover in each collector a slower-eluting component of the feed in an eluate.

Concomitantly with the collection of that eluate, we measure its volume and flow rate and automatically feed a corresponding volume of the eluant at the appropriate flow rate to a successive column segment continuously and in step with the collection of each eluate so that the added eluant represents a makeup for the collected eluate and the volume passing through the successive segments remains constant from segment to segment. The replacement of eluant corresponding to the collected eluate is thus synchronized with that collection.

Advantageously, the automatic connection of the outlets from the column segments to the respective collectors is effected with preprogrammed control of timing subsequent to the inception of elution by a computer preprogrammed for selective recovery of the components of the feed at the respective collectors, based upon rates of migration of the respective components through the segments.

We have discovered, moreover, that the efficiency of the system of the invention can be enhanced by associating the basic arrangement as described with information-gathering elements like spectrophotometers, spectrofluorometers, laser light scattering devices, conductivity measuring devices or the like to provide information as to the effluent from each of the column segments. The advantage of such information gathering elements is that a real-time control without precise preprogramming of the timing of valve operation can be used.

Such information gathering elements can be used in conjunction with computerized data processing elements, generally associated with spectrophotometers, for example, and like instruments to provide inputs to a computer which effects the actual control.

Generally the liquid feed will contain a solvent forming a mobile phase in which the components are entrained and in that case we prefer to initially equilibrate the entire system with that solvent before the injection of the liquid feed into first of the column segments. Then the liquid feed is injected in a pulse under the control of the computer.

The computer may be used for regulating the makeup of the eluant in accordance with the measured quantity and rate of eluate flowing to the collector, although a separate control circuit can be provided in a feedback loop between each makeup eluant pump and the sensor for measuring the quantity and flow rate of eluate collected.

The segments are preferably all charged with the biospecific sorbent although we may utilize a system in which the concentration of the biospecific ligand differs in the sorbents of the various column segments, as determined by using an appropriate engineering design and optimization computer program.

The apparatus for practicing our invention can comprise the cascade of column segments charged with the biospecific sorbent as described, means for passing eluant through the column segments in cascade, means for automatically connecting the outlets of the collector and means for controlling the makeup feed of eluant to each successive segment as determined by the eluate collected in the collector of the prior column segment. The automatic control means may be a computer as has been described and a respective pump and flow-directing valves controlled by the computer can be provided for eluant and for the feed.

Utilizing the bioaffinity chromatographic cascade system of the invention, we are able to improve efficiency over a single column conventional chromatographic separation utilizing the same materials to be separated and sorbents as measured by all of the critical criteria, namely, resolution, elution time and product concentration.

Because each column segment separates a particular component, and because the entire system operates concomitantly, the tendency of a particular band of a component to separate as it passes through the length of a column poses no problem, thereby accounting for the high resolution and short elution times reached by utilizing the system of the invention.

The system is particularly advantageous because it permits the most economical recovery of the most valuable components of a molecular biology production process and also a highly efficient method of separating biological-material compositions derived from other sources.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
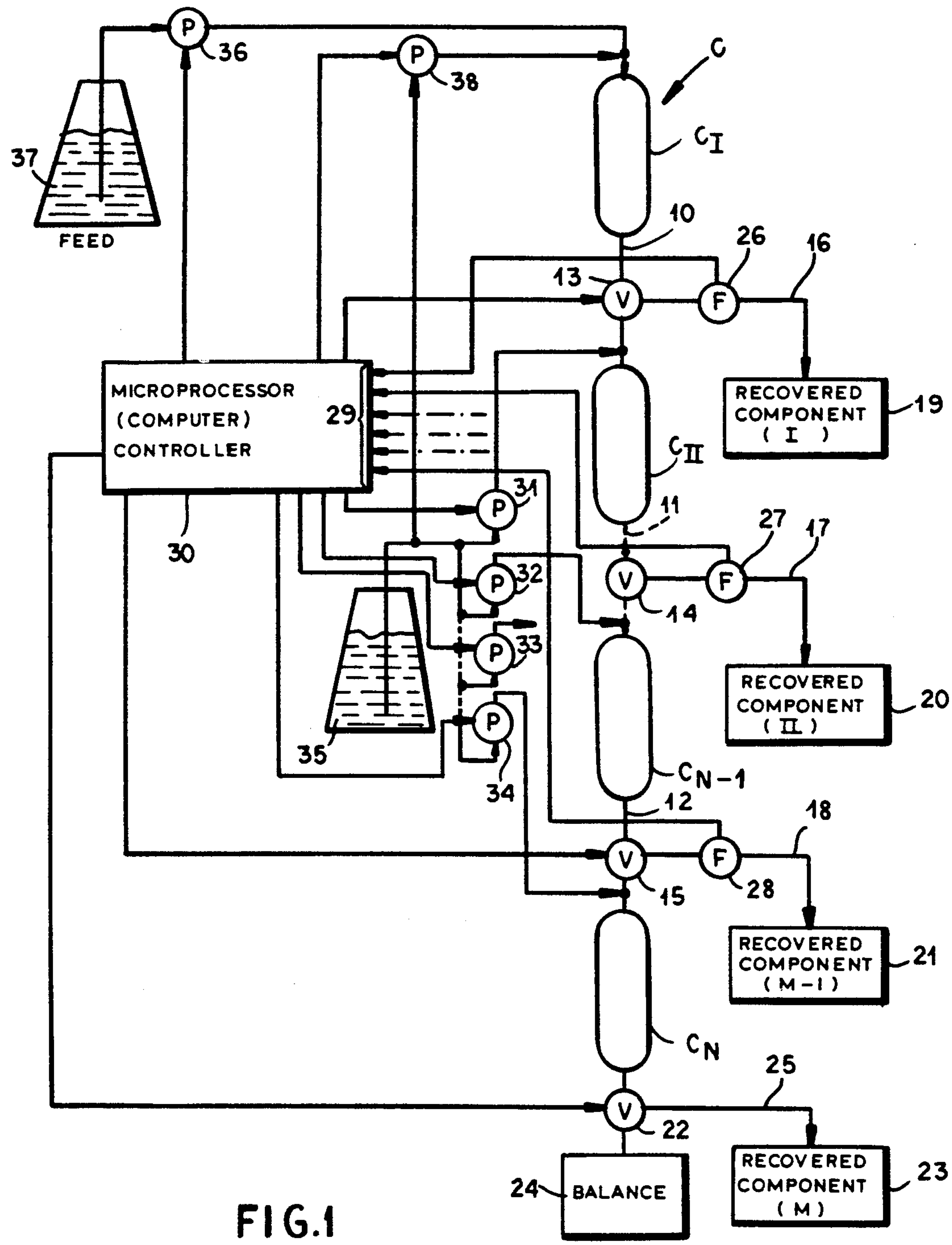
FIG. 1 is a flow diagram illustrating principles of the invention.

In the drawing, in which heavy lines represent liquid flow paths and light lines represent control signal paths, we have shown a cascade of column segments $C_I$, $C_{II}$, $C_{N-1}$ and $C_N$ representing N segments of a column cascade filled with a biospecific sorbent so that the same ligand is immobilized in the entire system although the degree of loading of the adsorbent with the ligand will differ from one column segment to the other, i.e. the ligand concentration will differ between the segments.

The column segments $C_I \ldots C_N$ are connected in cascade by lines 10, 11, . . . 12 containing valves 13, 14, . . . 15 which can be three-port two-position valves as shown. In one position of each valve, the lines 10, 11, 12 are unblocked and flow is effected from one column segment to the next directly and in cascade. In the other position of each valve 13–15, the outlet of each of the column segments $C_I \ldots C_{N-1}$ is connected to a respective bypass line 16, 17, 18 and to a respective collector 19, 20, 21 for the recovered components I, II . . . N−1.

Similarly, the last column segment $C_N$ of the cascade has a valve 22 which can be a four-port three-position valve as shown, and which selectively connects the outlet of segment $C_N$ to a collector 23 for recovered component N, to collector 24 for recovered component (N+1), or to a vessel 25 to receive the balance of the eluate.

Each of the lines 16–18 and possibly also the line 26 connected to the collector 23, can be provided with a respective flowmeter 27, 28, 29 and/or other monitoring device providing inputs 30 to a control system shown as a microprocessor-based computer 31 which also has outputs regulating pumps 32, 33, 34, 35 etc. feeding make-up eluant from a vessel 36 containing the eluant to the inlet end of each column segment ahead of which a corresponding quantity of the eluate has been deviated to the respective collector.

The computer controller 31 also controls a pump 37 delivering a pulse of the liquid feed from a vessel 38 to the inlet end of the first column segment $C_I$ as well as a pump 39 delivering the eluant to the first column segment $C_I$.

While the apparatus can operate to recover a separate component at each of the collectors and that, of course, is the ideal state, when fewer components are to be collected than there are column segments and collectors, the computer may be programmed to operate only those valves 13–15 and 22 which are required for collection of the respective components.

In operation, the computer first opens all of the valves 13–15 for direct flow and valve 32 for flow towards the balance collector 25, thus cutting off the bypasses to the respective collectors. When under this configuration, the cascade, represented generally at C, is first pre-equilibrated with a solvent forming the mobile phase of the liquid feed. That solvent can be the same as the eluant and in that case pump 39 is used. The computer is programmed to halt the feeding of the solvent when the entire cascade is filled with the solvent and the solvent emerges in a steady-state form at the vessel 25.

The computer then operates the pump 37 to load a pulse of the sample into the inlet of the column segment $C_I$.

The computer then cuts off flow of the feed and begins pumping eluant at a constant rate via pump 39 through the inlet of column segment $C_I$.

At preprogrammed time, depending upon the components to be collected, the valves 13–15 and 22 are switched to permit respective components to be bypassed in each case to the collectors 19–21, 23 and 24 simultaneously, the eluate removed from the cascade to each collector is measured and pumps 32–35 activated to deliver a corresponding flow of eluant as makeup to the next lower column segment $C_{II}$ . . . $C_N$ of the cascade.

In column segment $C_I$, the slowest-running or slowest-eluting component is recovered in the collector 19 while the faster running components continue through the cascade. Column segment $C_{II}$ separates the next slowest-eluting component, etc. Thus, to separate (N+1) components, the cascade requires N column segments.

EXAMPLE 1

Conventional BAC

Sample: Trypsin (Type III, Sigma), 0.2 ml solution of 10 mg protein/ml.

Column: 7 ml of Sepharose-Benzamidine (pABA) (0.125 micro mole pABA/ml).

Conditions: 25° C., pH 8.0 (0.5M Tris-HCl buffer, containing 20 mM $CaCl_2$).

Elution Rate: 10 ml/hr.

Soluble Benzamidine in eluant: A: 0.2 mM; B: 0.35 mM; C: 0.5 mM.

Figure 2:
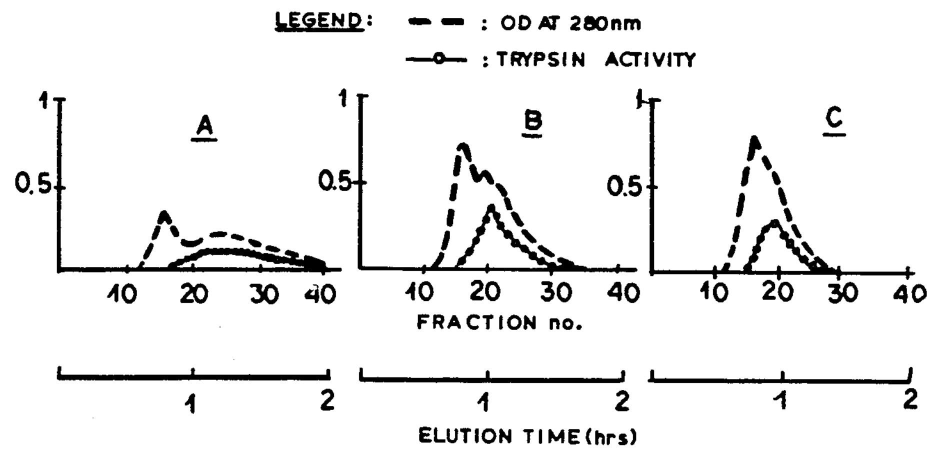
FIG. 2 represents the results obtained by conventional one-column bioaffinity chromatography (BAC)

The results are shown in FIG. 2.

EXAMPLE 2

Cascade BAC of the Invention

Sample: Trypsin (Type III, Sigma, as in paragraph 1 above), 0.2 ml solution of 4 mg protein/ml.

Columns: Two column segments, 3.5 ml ach, packed with Sepharose-Benzamidine (each column at different degree of substitution, as indicated below).

Conditions: As indicated in paragraph 1 above.

Elution Rate: As indicated in paragraph 1 above.

Soluble Benzamidine in eluant: As indicated below.

Figure 3:
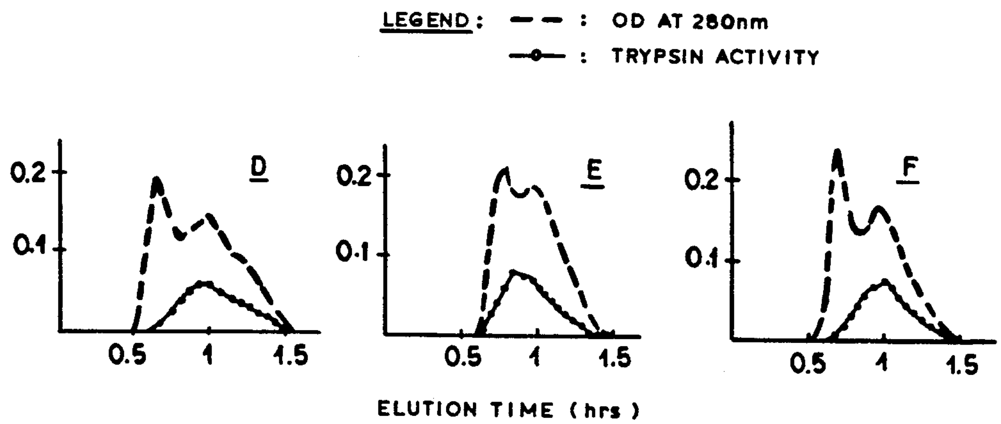
FIG. 3 represnts the results obtained with cascade-type BAC of the invention.

The results are shown in FIG. 3.

In the graph D of FIG. 3 there were 0.05 mM of immobilized pABA in the first column segment and 0.25 mM of immobilized pABA in the second column. The concentration of benzamidine in the eluant was 0.35 mM.

In the run represented in graph E, the same pABA concentration were used in the column segments but the concentration of benzamidine in the eluant was 0.5 mM.

The test represented in graph F was the same as that illustrated in graph E except that the immobilized pABA concentration in the first column segment was 0.083 mM.

A comparison of graphs E and F of the cascade system FIG. 3 with graphs B and C of the conventional system FIG. 2 shows better resolution. A comparison of graph D versus graph A and graph E versus graphs B and C shows shorter elution times and a similar comparison shows that a more concentrated product is obtained according to the invention.

Figure 4:
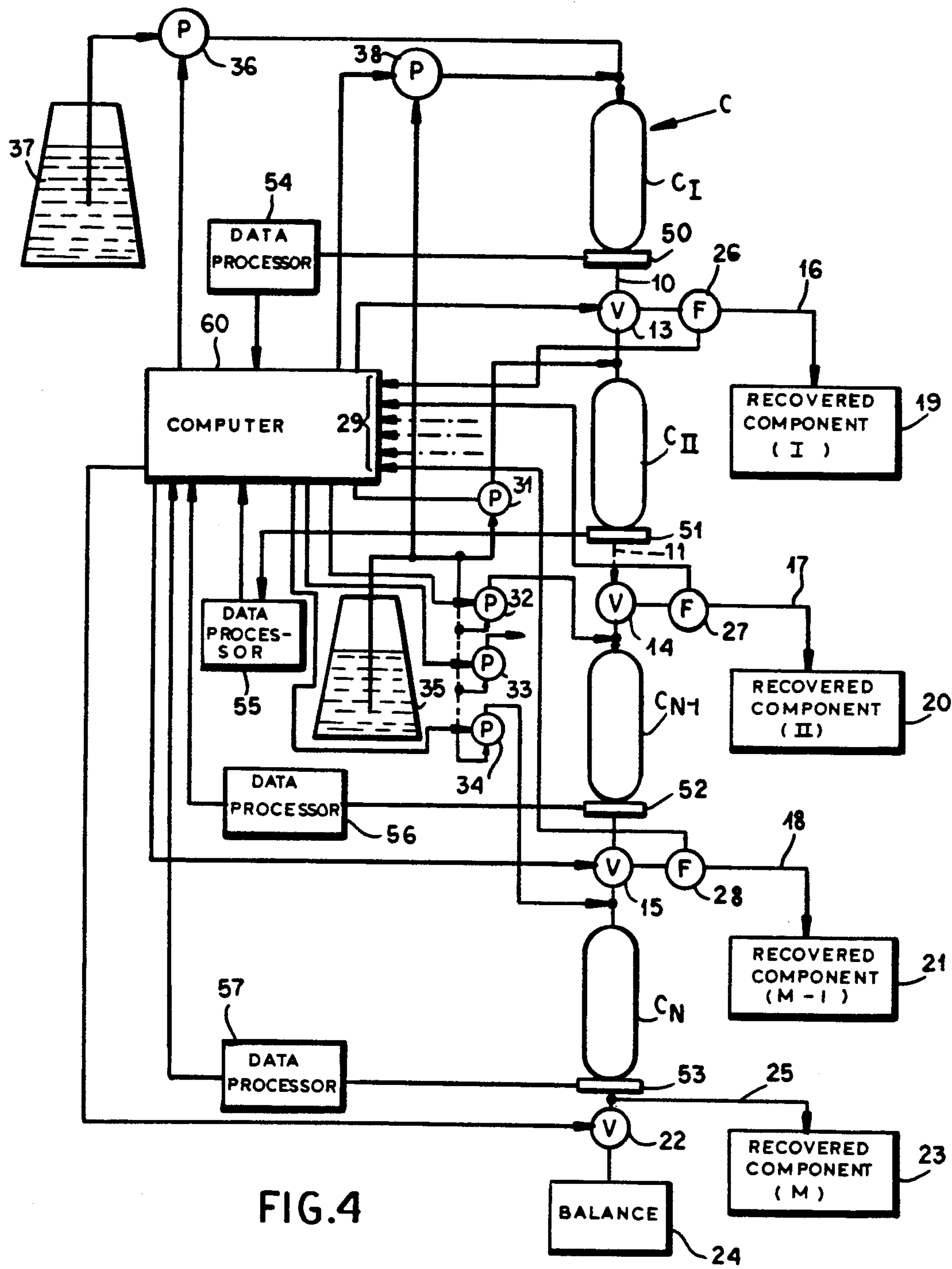
FIG. 4 shows, in flow diagram form, the system of the invention in an alternative embodiment.

FIG. 4 corresponds in essence to FIG. 1 with certain exceptions.

In this flow diagram, each of the column segments $C_I$ . . . $C_N$ is provided at its output with a respective information gathering element of the type described. Hence the information gathering elements 50, 51, 52 and 53 can be spectrophotometers in the preferred case but also spectrofluorometers, laser light scattering devices, conductivity meters of the like to monitor the outflows of the respective column segments.

Spectrophotometers and like instruments are generally associated with data processing elements which are represented at 54 through 57 and are capable of processing the data from the respective spectrophotometers and like instruments, in order to provide analyses of the outflows to the computer 60 which then controls the valves in the manner previously described. The computer 60, therefore, will select the desired eluate flow pattern most appropriate for the chromatographic system for recovery of the desired substance or substances to operate the valves and pumps utilizing real time control. Of course, this means that the spectrophotometers and like instruments, their data processors and the computer must be fast acting units.

Of course this embodiment should only be considered as an illustration of the invention for a better understanding thereof, at being understood that it is not intended to limit the invention to this particular embodiment. On the contrary, it is intended to cover also other alternatives or modifications as may be included within the scope of the invention as defined by the appended Claims.

We claim:

1. A method of bioaffinity separation for recovering simultaneously a plurality of bioactive components of a liquid feed which comprises the steps of:

(a) introducing a liquid feed containing a plurality of bioactive components into a first of a plurality of bioaffinity retention stages in cascade constituting respective column segments of a separation column packed with sorbent containing at least one biospecific substance so that said segments are loaded with said substance to different degrees along the length of the column;

(b) passing an eluant through said column segments in cascade to elute simultaneously and concurrently the components of said feed from the biospecific substance in each column segment;

(c) automatically connecting an outlet from each column segment to a respective collector upon passage of faster-eluting components of said feed to a successive column segment of the cascade to recover in each collector a slower-eluting component of said feed in an eluate;

(d) measuring the volume and flow rate of said eluate collected in each collector of a respective column segment and automatically feeding a corresponding makeup stream of said eluant to a successive column segment; and (e) controlling the automatic connection of said outlets from said column segments to the respective collectors with preprogrammed control of timing subsequent to the inception of elution by a computer for selective recovery of said components of said feed at the respective collectors.

2. The method defined in claim 1, wherein said liquid feed contains a solvent forming a mobile phase in which said components are entrained, and step (a) comprises:

($a_1$) initially equilibrating all of said segments with said solvent; and ($a_2$) then under the control of said computer, injecting into said first of said column segments, a pulsed quantity of said liquid feed.

3. The method defined in claim 1, further comprising the step of charging all of said segments with the same solid biospecific sorbent.

4. The method defined in claim 3, wherein said biospecific sorbent is agarose gel charged with benzamidine and said feed contains trypsin, said eluant containing p-aminobenzamidine.

5. The method defined in claim 1, wherein said column segments are packed with beads of agarose gel charged with a biospecific substance attached with different degrees of substitution for at least some of said segments.

6. The method defined in claim 5, wherein said biospecific substance is p-aminobenzamidine.

7. The method defined in claim 1 wherein the automatic connection of said outlets from said column segments to the respective collectors is affected by:

analyzing an outflow from each of said column segments in terms of flow rate, time and presence of a specific one of said bioactive components;

processing data representing each analysis of said outflow from each column segment; and controlling the automatic connections by the computer responding to the processed data.

8. An apparatus for recovering simultaneously a plurality of bioactive components of a liquid feed by bioaffinity separation, which comprises:

a plurality of bioaffinity retention stages in cascade constituting respective column segments of a separation column containing at least one biospecific sorbent;

respective collectors connectable with outlets of each of said column segments;

means for introducing a liquid feed containing a plurality of bioactive components into a first of said plurality of said bioaffinity retention stages in cascade constituting said respective column segments of said separation column so that said segments are loaded with said biospecific substance to different degrees along the length of the column;

means for passing an eluant through said column segments in cascade simultaneously and concurrently to elute the components of said feed from the biospecific sorbent in each column segment and afford simultaneous recovery of said components;

means for automatically connecting an outlet from each column segment to a respective one of said collectors upon passage of faster-eluting components of said feed to a successive column segment of the cascade to recover in each collector a slower-eluting component of said feed in an eluate; and means for measuring the volume and flow rate of said eluate collected in each collector of a respective column segment and automatically feeding a corresponding makeup stream of said eluant to a successive column segment, said means for automatically connecting an outlet from each column segment to a respective one of said collectors including an electrically controlled valve for selectively connecting each of said outlets with the successive column segment and with the respective collector, and a computer connected to said valves and with preprogrammed control of timing of operation of said valves subsequent to the inception of elution for selective recovery of said components of said feed at the respective collectors.

9. The apparatus defined in claim 8, wherein said means for measuring the volume and flow rate of said eluate collected in each collector are connected to said computer and said computer effects automatic feed of said corresponding make-up stream of said eluant to a successive column segment.

10. The apparatus defined in claim 8, wherein said means for introducing a liquid feed containing a plurality of bioactive components into a first of said plurality of said bioaffinity retention stages includes a vessel containing said feed and a pump controlled by said computer and connected to said first of said column segments.

11. The apparatus defined in claim 8, wherein said means for passing an eluant through said column segments in cascade includes a vessel containing said eluant and a pump controlled by said computer and connecting said vessel with said first column segment.

12. The apparatus defined in claim 8, wherein the means for automatically connecting an outlet from each column segment to a respective one of said collectors includes:

means for analyzing an outflow from each of said column segments in terms of flow rate, time and presence of a specific one said bioactive components; and means for processing data resulting from the analysis of the outflow from each column segment by said means for analyzing, said computer being connected to said means for processing.

* * * * *